United States Patent Office 3,609,911
Patented Oct. 5, 1971

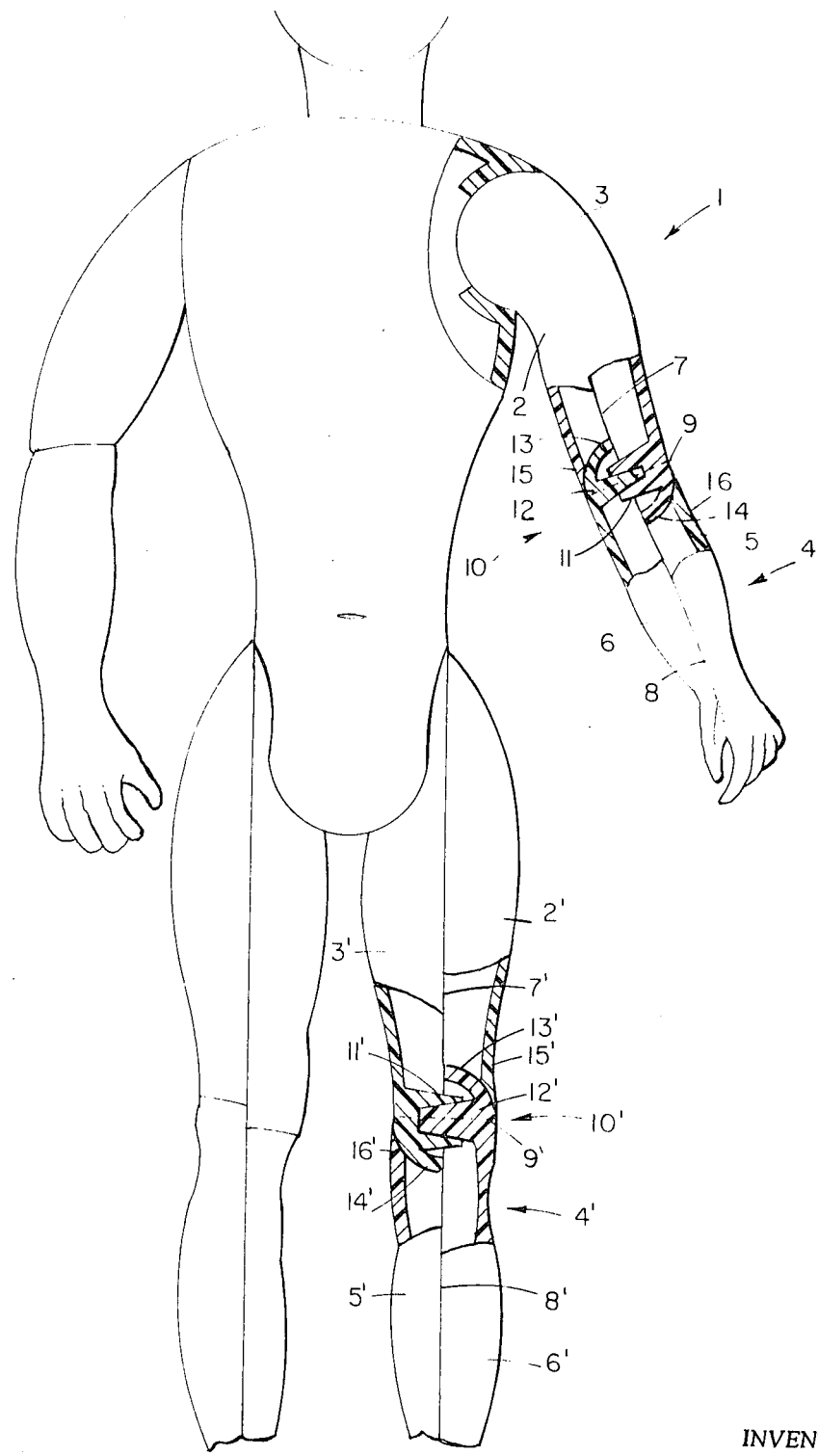

3,609,911
FLEXIBLE LIMB FOR A CHILD'S DOLL
Wilhelm Hanf, Viernheim, and Gunther Wilbring, Leutershausen, Germany, assignors to Firma Schildkrot AG, Mannheim-Neckarau, Germany
Filed Apr. 16, 1969, Ser. No. 816,760
Claims priority, application Germany, Apr. 18, 1968, P 17 03 214.3
Int. Cl. A63h 3/46
U.S. Cl. 46—163            19 Claims

ABSTRACT OF THE DISCLOSURE

A doll's limb featuring a movable joint therefor capable of being assembled in an axial direction and limb halves comprising a plurality of rigidly interconnected members, one of which members forms the joint element for its respective limb portion while another member axially encloses the member carrying the complementary joint element for the other limb half in such a manner that the joint forming elements cannot be disassembled in an axial direction.

BACKGROUND OF THE INVENTION

(1) Field of the invention

This invention relates to a flexible arm or leg for a child's doll, the arm being provided with an elbow joint and the leg with a knee joint.

(2) Description of the prior art

A doll's leg and/or arm structure is known, in which the thigh element and the lower leg element—or the upper and lower arm elements—are formed from synthetic material members bonded together, with a joint therebetween. Since doll's limbs—whether arms or legs—are shaped similarly and more or less to the same dimensions, the description which follows will refer to an arm, both when dealing with prior art and when relating to the present invention. When applied in conjunction with a doll's leg, the terms "arm," "upper arm," "forearm," "elbow joint," "shoulder joint" are to be replaced with parallel expressions "leg," "thigh," "lower leg," "knee joint" and "hip joint." In the prior art doll's arm, the joint-forming elements are present in the shape of a framework which only sketchily outlines the outer configuration of the joint since the entire forearm, joint and upper arm is covered by a continuous "skin," preferably of synthetic foil, which covers all gaps and interspaces between the solid framework elements determining the outer shape. Thus, the prior art joint closely imitates nature, which is the purpose of a doll, but does it in a manner which becomes rather expensive in mass production.

SUMMARY OF THE INVENTION

In an attempt to reduce production costs, the present invention is directed to a doll's arm featuring an elbow joint capable of being assembled in axial direction, and arm halves comprising a plurality of rigidly interconnected members, one of which forms the elbow joint element for the given arm-half, while another axially encloses the member carrying the complementary joint element for the other arm-half in such a manner that the joint-forming elements cannot be disassembled in axial direction. In a similar way, the doll's leg based on this invention and featuring a knee joint is characterized in that the joint is capable of being assembled in axial direction, and that each of the thigh and lower leg parts consists of a plurality of rigidly interconnected members, one of which forms the knee joint element, while another axially encloses the member carrying the complementary joint element for the other leg-half in such a manner that the joint-forming elements cannot be disassembled in axial direction.

BRIEF DESCRIPTION OF THE DRAWING

The invention will now be described in greater detail with the aid of an embodiment illustrated in the accompanying drawing. The single figure of the latter shows a doll whose shoulder, arm and knee joint are partially cut away. The corresponding portions of the arms and legs are identified by the same reference numerals, those for the legs being provided with an additional "prime" (') symbol for the sake of differentiation.

DESCRIPTION OF THE SPECIFIC EMBODIMENTS

The upper arm 1 and the lower arm 4 each consist of two half-shells 2 and 3 and 5 and 6 respectively, which means that members 2 and 3 are bonded along common edges 7 which abut one another, while members 5 and 6 are similarly bonded in any suitable manner along their common edges 8 which likewise mutually abut.

When the juxtaposed edges of a half-shell are imaginarily interconnected, a plane is obtained along which are positioned these invisible connecting lines. This plane (7 or 8) intersects the geometrical axis 9 of the elbow joint 10. The axis 9 is preferably perpendicular to the imaginary plane which is preferably a flat surface. The outer surface of half-shells 2, 3, 5 and 6 has the shape of the doll's arm. The arm joint (elbow joint) is formed from two elements, each of which forms part of only one half-shell. One of the elements is a centering piece 11 and has an aperture in the shape of a truncated cone, while the other element is a conical lug 12 which fits into the centering piece 11. Means known per se ensure that the lug 12, when fitted into centering piece 11, remains in any desired position, in other words, friction therebetween is sufficiently high to permit the joint to retain any position adopted.

If half-shell 2 is designated the inner upper arm shell and half-shell 3 the outer upper arm shell, half-shells 6 and 5 being respectively the inner and outer lower arm shells, it may be seen from the figure that the joint-forming elements (i.e., lug and centering piece) form part of the inner shell of one arm-half and part of the outer shell of the other arm-half respectively, i.e., parts of opposite half-shells. The edges of half-shells 3 and 6 are positioned in a common plane as a closed line within the area of joint 10. The corresponding edges of the two other half-shells 2 and 5, on the other hand, lie in a common plane only up to the immediate proximity of the given opposite half-shell 6 and 3 respectively of the other arm-half. One of the half-shells 3 and 6 which carries the joint-forming elements is provided with a ball-shaped extremity of approximately quarter-sphere configuration within the area of the joint. The other half-shell 5 or 2 respectively, whose outer flat edge is not closed engages the spherical extremity in an arrangement similar to a ball-and-socket joint. The spherical extremities are identified with reference numerals 13 and 14 in the figure; however, it is not absolutely necessary for the extremities to be spherical; it is sufficient if they are rotationally symmetrical relative to axis 9 over a limited arc. Edges 15 and 16 respectively which abut the rotationally or axially symmetrical outer shell surfaces are similarly rotationally symmetrical relative to the same axis so that in every position of the elements forming the joint, a smallest possible gap is formed between the outer surface of spherical extremity 13 and edge 15 or between spherical extremity 14 and edge 16. The rotationally symmetrical configuration, of course, can be limited to the swinging range of the joint.

In this configuration, e.g., in the lower arm, that length of edge 16, which is farthest removed from the flat edge 8 is also closest to axis 9, or the assembly can be so shaped that this is the case. Accordingly, edge 16 so overlaps spherical extremity 14—as seen in the figure—that after half-shells 6 and 5 are bonded together, e.g., cemented, the resulting lower arm cannot be removed any more in the direction of axis 9, i.e., in the direction towards the doll's body, in the position shown in the figure, because edge 16 abuts extremity 14. The same is valid for the relationship between edge 15 and extremity 13. As mentioned hereinabove, a preferred embodiment would feature spherically shaped joint extremities 13 and 14.

The fabrication of an arm of this type is simple, inasmuch as centering piece 11 and lug 12 are first assembled, thus forming the joint from portions of half-shells 3 and 6. The remaining half-shells 2 and 5 are then bonded with the associated half-shells 3 and 6; the entire arm is now ready and cannot be disassembled again unless force is used to pry the individual members apart.

What is claimed is:

1. A doll's leg including a knee-joint, thigh and lower leg, the improvement wherein said joint is capable of being assembled in an axial direction, and said thigh and lower leg portions respectively consist of a plurality of rigidly interconnected members of which one member forms a joint element for said thigh portion while another member axially partially encloses an adjacent member carrying the complementary joint element of said lower leg portion so that the resulting joint elements cannot be axially disassembled, said rigidly interconnected members being each half-shells of the respective portion defined.

2. The doll's leg according to claim 1, wherein said half-shells when interconnected determine the outer shape of the leg.

3. The doll's leg according to claim 1, wherein said thigh and lower leg each consist of two portions defined by half-shells.

4. The doll's leg according to claim 2, wherein said thigh and lower leg each consist of two portions defined by half-shells.

5. The doll's leg according to claim 1, wherein the elements forming the joint comprise a lug and a centering piece adapted to rotatably accept the lug.

6. A doll's leg including a knee-joint, thigh and lower leg, the improvement wherein said joint is capable of being assembled in an axial direction, and said thigh and lower leg portions respectively consist of a plurality of rigidly interconnected half-shells of which one half-shell forms a joint element for said thigh portion while another complementary half-shell axially partially encloses an adjacent half-shell carrying a complementary joint element of said lower leg portion so that the resulting joint elements cannot be axially disassembled, the elements forming the joint comprising a lug and a centering piece adapted to rotatably accept the lug, a plane defined by mutual abutting edges of two half-shells intersecting the axis of the centering piece-lug assembly in the area of the joint, said lug and said centering piece being rigidly connected with their respective half-shells positioned at opposite sides of the dividing plane and the other complementary half-shell so overlapping said joint element with its free edge that the assembled joint cannot be taken apart again.

7. The doll's leg according to claim 1, wherein the joint formed has a high degree of friction so that once adapted it is maintainable in any position.

8. The doll's leg according to claim 6, wherein the joint formed has a high degree of friction so that once adapted it is maintainable in any position.

9. The doll's leg according to claim 1, wherein the half-shell edges bonded together are aligned in a planar surface the resulting plane intersecting the axis of the joint at right angles within the area of the joint.

10. The doll's leg according to claim 2, wherein the half-shell edges bonded together are aligned in a planar surface the resulting plane intersecting the axis of the joint at right angles within the area of the joint.

11. The doll's leg according to claim 6, wherein the half-shell edges bonded together are aligned in a planar surface the resulting plane intersecting the axis of the joint at right angles within the area of the joint.

12. A doll's arm including an elbow joint, upper arm and forearm, the improvement wherein said joint is capable of being assembled in an axial direction, and said upper arm and fore arm portions respectively consist of a plurality of rigidly interconnected members of which one member forms a joint element for said upper arm portion while another member axially partially encloses an adjacent member carrying a complementary joint element of said forearm portion so that the resulting joint elements cannot be axially disassembled, said rigidly interconnected members being each half-shells of the respective portion defined.

13. The doll's arm according to claim 12, wherein said half-shells when interconnected determine the outer shape of the arm.

14. The doll's arm according to claim 12, wherein said upper arm and forearm each consist of two portions defined by half-shells.

15. The doll's arm according to claim 13 wherein said upper arm and forearm each consist of two portions defined by half-shells.

16. The doll's arm according to claim 12, wherein the elements forming the joint comprise a lug and a centering piece adapted to rotatably accept the lug.

17. A doll's arm including an elbow joint, upper arm and forearm, the improvement wherein said joint is capable of being assembled in an axial direction, and said upper arm and forearm portions respectively consist of a plurality of rigidly interconnected half-shells of which one half-shell forms a joint element for said upper arm portion while another complementary half-shell axially partially encloses an adjacent half-shell carrying a complementary joint element of said forearm portion so that the resulting joint elements cannot be axially disassembled, the elements forming the joint comprising a lug and a centering piece adapted to rotatably accept the lug, a plane defined by mutual abutting edges of two half-shells intersecting the axis of the centering piece-lug assembly in the area of the joint, said lug and said centering piece being rigidly connected with their respective half-shells positioned at opposite sides of the dividing plane and the other complementary half-shell so overlapping said joint element with its free edge that the assembled joint cannot be taken apart again.

18. The doll's arm according to claim 12, wherein the half-shell edges when bonded together are aligned in a planar surface the resulting plane intersecting the axis of the joint at right angles within the area of the joint.

19. A doll's limb including a movable connecting joint, upper and lower limb portions, the improvement wherein said movable joint is adapted to be assembled in an axial direction, and said upper and lower limb portions respectively comprise a plurality of rigidly interconnected members of which one member forms a movable joint element for said upper limb portion while another member of said members axially partially encloses an adjacent member carrying a complementary movable joint element of said lower limb portion so that the resulting joint elements cannot be axially disassembled, said rigidly interconnected members being each half-shells of the respective portion defined.

References Cited

UNITED STATES PATENTS

| | | | |
|---|---|---|---|
| 2,362,383 | 11/1944 | Lendiara | 46—173 X |
| 2,761,245 | 9/1956 | Weh | 46—173 |
| 2,791,063 | 5/1957 | Gardel et al. | 46—173 |
| 2,877,506 | 3/1959 | Almoslino | 46—173 X |

LOUIS G. MANCENE, Primary Examiner

D. L. WEINHOLD, JR., Assistant Examiner